(12) United States Patent
Goellner

(10) Patent No.: US 10,882,124 B2
(45) Date of Patent: Jan. 5, 2021

(54) SAW BLADE STABILIZER AND METHOD

(71) Applicant: Willy Goellner, Rockford, IL (US)

(72) Inventor: Willy Goellner, Rockford, IL (US)

(73) Assignee: Advanced Machine & Engineering Co., Rockford, IL (US)

(*) Notice: Subject to any disclaimer, the term of this patent is extended or adjusted under 35 U.S.C. 154(b) by 92 days.

(21) Appl. No.: 16/124,729

(22) Filed: Sep. 7, 2018

(65) Prior Publication Data
US 2020/0078877 A1 Mar. 12, 2020

(51) Int. Cl.
B23D 47/00 (2006.01)

(52) U.S. Cl.
CPC .................. B23D 47/005 (2013.01)

(58) Field of Classification Search
CPC ...... B23D 47/005; B26D 59/02; B26D 3/185; B27B 5/34; B27B 7/04; Y10T 83/8878; Y10T 83/9457; Y10T 83/8886; Y10T 83/8889; Y10T 83/9403; Y10T 83/929; Y10T 83/888; Y10T 83/8881
USPC ...... 83/821, 824, 471.2, 827, 676, 829, 828, 83/168, 823, 820, 822, 523, 425.3, 425.4, 83/665, 659, 273, 169; 30/273, 369, 373, 30/374, 375, 376, 282, 289
See application file for complete search history.

(56) References Cited

U.S. PATENT DOCUMENTS

| | | | | |
|---|---|---|---|---|
| 261,645 A | * | 7/1882 | Winter | B26D 3/185 83/425.3 |
| 344,175 A | * | 6/1886 | East | B23D 47/005 83/827 |
| 1,537,980 A | * | 5/1925 | Asselin | B23D 49/006 30/392 |
| 1,840,731 A | | 1/1932 | Mathews et al. | |
| 3,059,516 A | * | 10/1962 | Cleland | B23D 55/082 83/435.11 |
| 3,094,030 A | * | 6/1963 | Cerra | B23D 21/00 83/555 |
| 3,540,334 A | | 11/1970 | McLauchian | |
| 3,645,304 A | | 2/1972 | Thrasher | |
| 3,656,393 A | | 4/1972 | Goellner | |

(Continued)

FOREIGN PATENT DOCUMENTS

| | | | |
|---|---|---|---|
| CN | 202087899 U | 12/2011 | |
| DE | 3142102 A1 * | 5/1983 | ........... B23D 47/005 |
| EP | 1 123 768 A2 | 8/2001 | |

OTHER PUBLICATIONS

Willy Goellner; These 13 Issues Will Destroy High Production Carbide Tipped Circular Saw Blades; Sep. 13, 2017; 11 pages.

(Continued)

Primary Examiner — Ghassem Alie
(74) Attorney, Agent, or Firm — Reinhart Boerner Van Deuren P.C.

(57) ABSTRACT

A saw blade stabilizer is provided. The saw blade stabilizer includes a housing and a shaft at least partially within a cavity of the housing. A piston is connected to one end of the shaft. A mechanical wedge is connected to a second end of the shaft in the housing. A stabilizer contact element slideably receives a portion of the mechanical wedge. Movement of the piston slides the portion of the mechanical wedge within the stabilizer contact element and moves the stabilizer contact element in a first direction not in line with the movement of the piston.

16 Claims, 7 Drawing Sheets

(56) References Cited

U.S. PATENT DOCUMENTS

| | | | |
|---|---|---|---|
| 3,667,514 A * | 6/1972 | Krog | B27B 5/34 |
| | | | 83/471.1 |
| 3,772,956 A | 11/1973 | McMillan | |
| 3,797,354 A | 3/1974 | Allison | |
| 3,828,642 A | 8/1974 | Orendi | |
| 4,406,202 A | 9/1983 | Saljé et al. | |
| 4,463,645 A | 8/1984 | Goellner | |
| 4,534,254 A * | 8/1985 | Budzich | H01B 15/005 |
| | | | 29/403.3 |
| 4,854,207 A | 8/1989 | Kirbach et al. | |
| 4,977,802 A | 12/1990 | Kirbach | |
| 5,074,179 A | 12/1991 | Omi | |
| 5,927,174 A * | 7/1999 | Newnes | B27B 5/34 |
| | | | 83/13 |
| 6,785,971 B2 | 9/2004 | McDonnell | |
| 6,986,300 B2 | 1/2006 | Belfiglio | |
| 7,127,978 B2 | 10/2006 | Boss et al. | |
| 7,131,205 B2 | 11/2006 | McDonnell | |
| 7,325,473 B2 | 2/2008 | Belfiglio | |
| 7,331,407 B2 | 2/2008 | Stirm et al. | |
| 7,739,937 B2 * | 6/2010 | Pollard, Sr. | B23D 55/082 |
| | | | 83/820 |
| 8,695,465 B2 | 4/2014 | Goellner | |

OTHER PUBLICATIONS

D.S. Dugdale; Circular Saw Vibration During Initial Engagement; 1979; 2 pages; Department of Mechanical Engineering, University of Manchester Institute of Science and Technology 1979.

Gary S. Schajer; Practical measurement of circular saw vibration mode shapes; Abstract; 1 page; May 21, 2012.

* cited by examiner

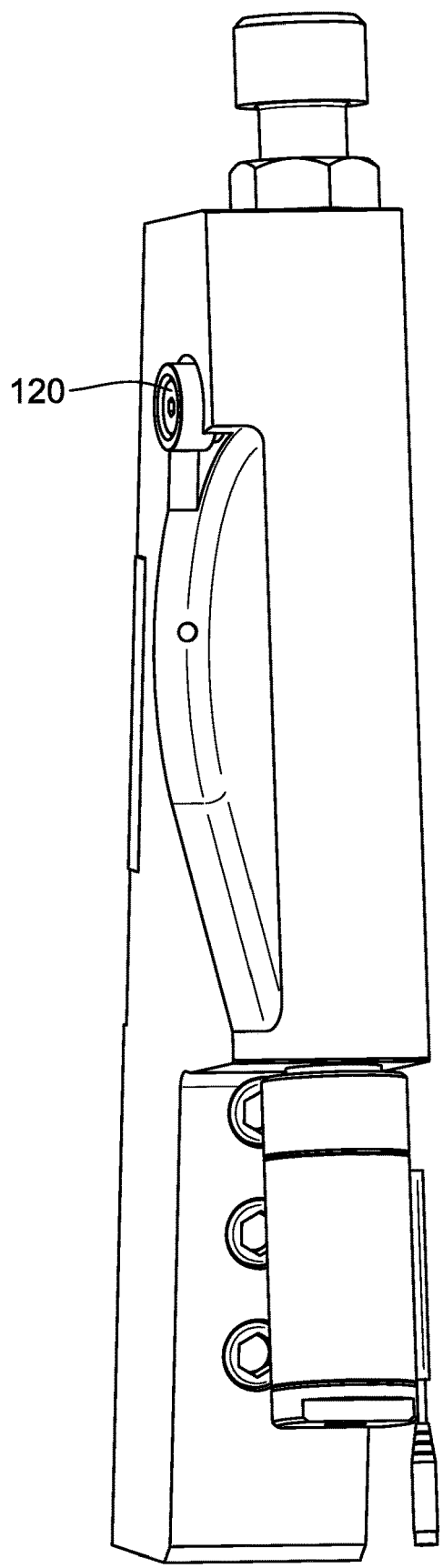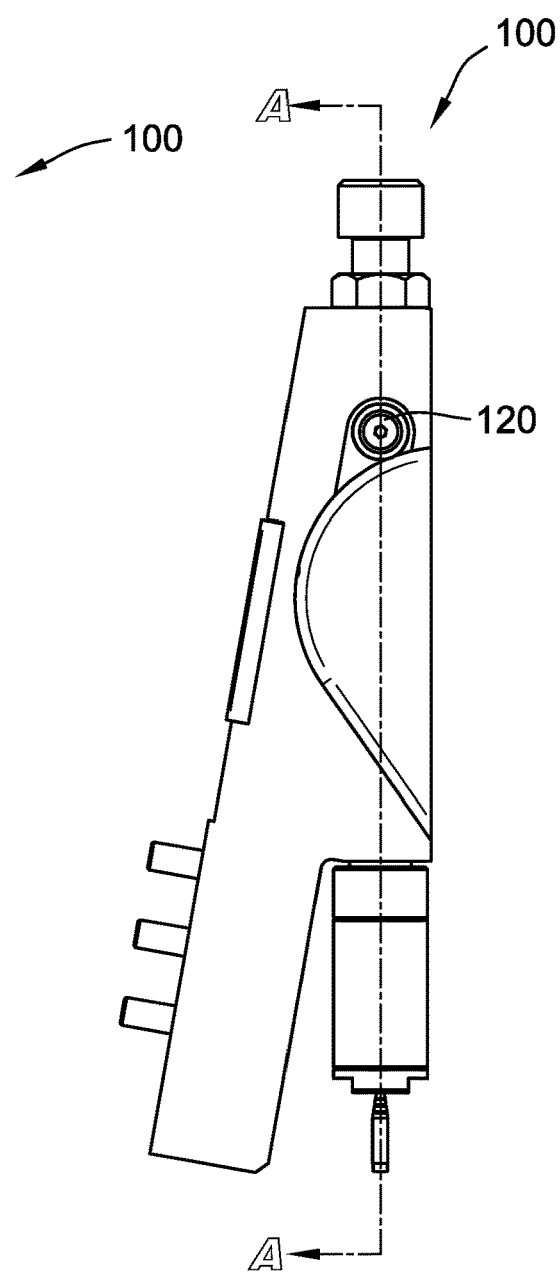
FIG. 2
FIG. 3

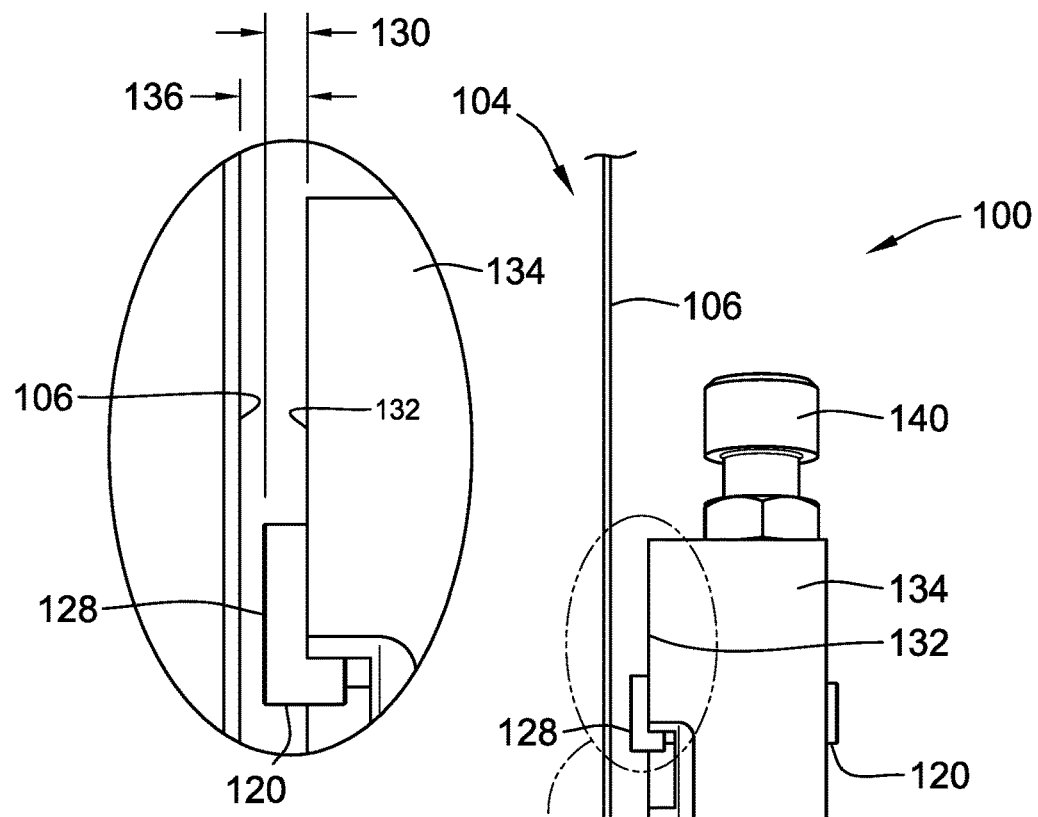
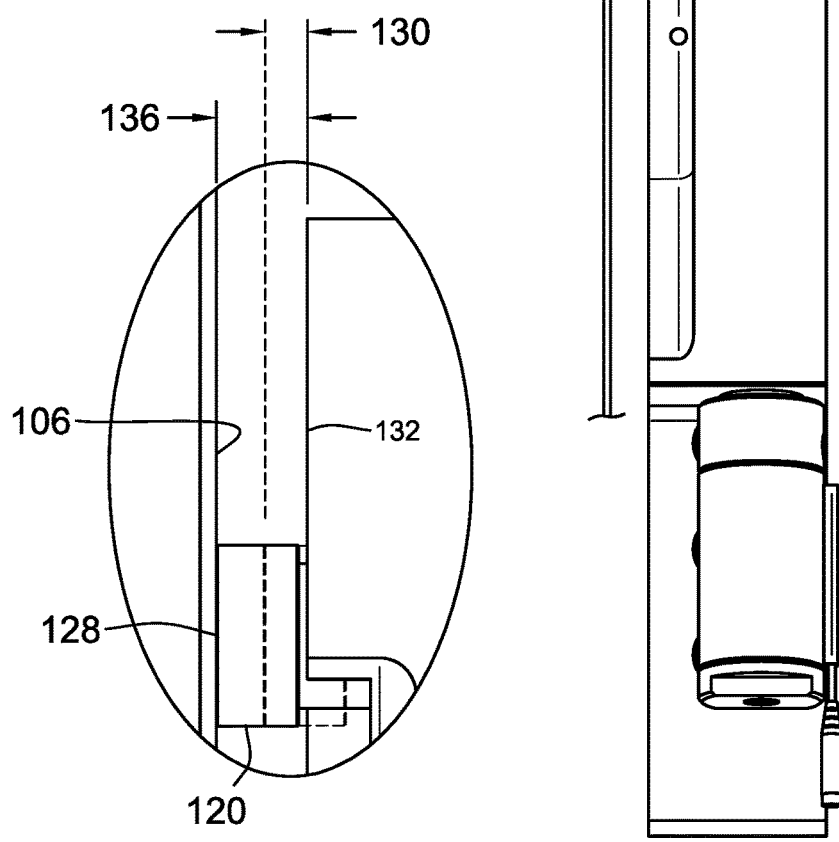
FIG. 4B
FIG. 4C
FIG. 4A

SAW BLADE STABILIZER AND METHOD

FIELD OF THE INVENTION

This invention generally relates to stabilization of circular saw blades, and more particularly to the stabilization of large circular saw blades of the type used in cut-off sawing operations for workpieces made of metal.

BACKGROUND OF THE INVENTION

Saw blades can approach six feet in diameter to cut workpieces of up to 24 inches in height and/or width at speeds 10 times faster than systems utilizing band saws. In circular cut-off saw systems to achieve a high level of precision in cut-off length, and a smooth finish on the cut-off surface of the finished workpiece, using a circular saw blade, it is necessary to deal with a number of factors affecting the path of the saw blade as it enters and passes through the workpiece during the sawing operation.

For example, the saw blade needs to be precisely constructed from suitable materials which will minimize dimensional inaccuracies of the blade itself, both at rest and while exposed to the working loads and heat generated during the cut-off process. The blade must also be accurately and securely mounted on a driving spindle in a manner which reduces wobble and run-out of the cutting edge. The configuration of the cutting teeth on the cutting edge of the saw blade can also influence on how true the blade will run and the nature of vibration introduced into the blade during the cutting operation. Such circular saw blades are also inherently distorted by vibration modes induced in the circular disk of the blade by the action of the teeth on the cutting edge impacting on and slicing through the workpiece.

There are a variety of apparatuses and methods for dealing with the various factors influencing the performance of a circular saw blade. For example, U.S. Pat. No. 3,656,393 to Goellner discloses a method and apparatus for driving a saw blade and positively locking the saw blade to the nose of a driving spindle in a manner which minimizes backlash between the blade and spindle. U.S. Pat. No. 4,463,645 to Goellner discloses a circular saw blade having a dual chip-cutting action in which all of the saw teeth are of like width and radial height to improve cutting action of the blade in a variety of respects, including significantly changing the manner in which the cutting teeth impact upon and cut through a workpiece in a way which positively influences deformation of the blade disk as a result of vibration induced by the cutting action of the saw teeth through the workpiece.

U.S. Pat. No. 8,695,465 to Goellner discloses use of a blade stabilizer and method directed to exerting a force against the saw blade in a direction substantially perpendicular to a cutting plane of the saw blade to address vibration of a center-clamped circular plate, such as a circular saw blade in cross cutting operations.

The blade stabilizer is a hydraulic device that includes a fluid pressure chamber that is operatively connected to a stabilizer contact element for urging the stabilizer contact element to move in a direction perpendicular to the saw blade. The movement is in response to the application of an actuating fluid pressure on a piston at a proximal end of shaft within the fluid pressure chamber such that the piston, shaft and the stabilizer contact element move in the same direction to move the stabilizer contact element from a retracted position to an extended position.

The contact element is mounted on a distal end of the cylinder shaft in a position where it can contact a face of the saw blade when the first blade stabilizer is actuated by application of fluid pressure to the fluid pressure chamber. The hydraulic pressure moves the piston in a direction normal to the blade face to counter the force of the vibrating blade acting against the contact element. Thus, the cylinder shaft is held by high hydraulic pressure to prevent the contact element from backing off the first face of the saw blade.

Unfortunately, despite the functionality of the foregoing solution via hydraulic means to address stabilization of a circular saw blade, the solution is too costly and complex. The solution requires costly hydraulic intensifiers and complex piping to provide the required hydraulic to hold the contact element in place to counter the large vibration force of the circular saw blade acting against the contact element.

BRIEF SUMMARY OF THE INVENTION

Embodiments of the invention provide a simple and cost effective blade stabilizer to stabilize a saw blade with a contact element held against a blade face via mechanical means.

More specifically, embodiments of the invention provide a blade stabilizer having a piston moveable within a cylinder in two directions. The piston is connected to a shaft which may be integral with an end of a wedge mechanism or in other embodiments may be attached to the end of the wedge mechanism via various attachment means known to those familiar with shafts and pistons. The shaft and wedge mechanism are moveable in the same two directions as the piston. A stabilizer contact element is operatively connected to the mechanical wedge. The stabilizer contact element is located at least partially within a bore defined by a housing of the blade stabilizer.

The wedge mechanism at an end opposite the end attached to the piston may have a slideable protrusion that slides within a channel defined by the stabilizer contact element. The channel may be an obliquely extending channel relative to a central axis of the wedge mechanism which is in line with a shaft central longitudinal axis. As the slideable protrusion of the wedge mechanism slides within the channel it moves the contact element in a direction that is not in line with the two directions of travel of the wedge mechanism to either contact and stabilize the blade face or to retract the stabilizer contact element away from the blade face. By not in line with it is meant in a direction of travel that is at an angle relative to the two directions of travel of the wedge mechanism and where the angle is not zero. In an embodiment the angle and direction of travel is normal to the two directions of travel of the wedge mechanism. Accordingly, the arrangement of the wedge mechanism and the slideable protrusion provide a mechanical means to hold the contact element in place against the blade face to stabilize the blade in its rotation and more particularly in its rotation at the very beginning of a cut.

The simple mechanical means provided by embodiments of the solution differ from the previous solutions because the mechanical means provided by the instant embodiments are operable using compressed air that is generally found in manufacturing environments at 80 to 120 pounds per square inch. Thus, the use of readily available compressed air instead of pressurized hydraulic fluid greatly reduces the complexity of the heretofore known hydraulic actuated blade stabilizers. Indeed, use of the mechanical means with the wedge mechanism operatively connected to the stabilizer contact element instead of pressurized hydraulic fluid provides an elegant and simple mechanical solution that provides the holding force to stabilize the blade.

One can readily understand that in embodiments, although compressed air may be utilized, other embodiments can use hydraulic pressure but at significantly lower pressures than hereto for known in blade stabilizers because the hydraulic pressure merely moves the piston and does not act as a holding force to keep the stabilizer contact element in contact with the blade face.

In an embodiment, the slide protrusion has a tip at a distal end relative to the piston. As the slide protrusion of the wedge mechanism travels within an oblique channel of the stabilizer contact element it moves the stabilizer contact element to contact the blade face. The tip may contact a set screw that stops, that is limits the travel of the slide protrusion. Travel of the slide protrusion may be limited by adjustment of the set screw such that the slide stabilizer contact element extends only to the extent necessary to contact the blade face. Thus, the set screw can be adjusted to limit the amount of travel of the wedge mechanism towards the stabilizer contact element which in turn limits the amount of travel of the stabilizer contact element as it extends to contact the blade face.

In an embodiment, at least a portion of the shaft and the wedge mechanism may be located in cavity of the saw blade stabilizer. The stabilizer contact element may be located at least partially in a bore extending in a direction that is not in line with a central longitudinal axis of the cavity. In an embodiment the bore extends normal to the central longitudinal axis of the cavity.

In yet another aspect, an embodiment of the invention provides a method for stabilizing a circular saw blade. The method includes the step of applying compressed air to move a piston within a cylinder. Movement of the piston moves a shaft which moves a mechanical wedge which moves a stabilizer contact element to contact a blade face to stabilize a blade as the blade rotates. More specifically, the piston is connected to a shaft which may be integral with an end of a wedge mechanism or in other embodiments may be attached to the end of the wedge mechanism via various attachment means known to those familiar with shafts and pistons. The shaft and wedge mechanism are moveable in the same two directions as the piston. A stabilizer contact element is operatively connected to the mechanical wedge. The stabilizer contact element is located at least partially within a bore defined by a housing of the blade stabilizer.

The wedge mechanism at an end opposite the end attached to the piston may have a slideable protrusion that slides within a channel defined by the stabilizer contact element. The channel may be an obliquely extending channel relative to a central axis of the wedge mechanism and a central axis of the shaft. As the slideable protrusion of the wedge mechanism slides within the channel it moves the contact element in a direction that is not in line with the two directions of travel of the wedge mechanism to either contact and stabilize the blade face or to retract the stabilizer contact element away from the blade face. Accordingly, the arrangement of the wedge mechanism and the slideable protrusion provide a mechanical means to hold the contact element in place against the blade face to stabilize the blade in its rotation and more particularly in its rotation at the very beginning of a cut.

In an embodiment, the method further comprises the step of adjusting a set screw to limit the amount of travel of the wedge mechanism towards the stabilizer contact element which in turn limits the amount of travel of the stabilizer contact element as it extends to contact the blade face. More specifically, the slide protrusion has a tip at a distal end relative to the piston. As the slide protrusion of the wedge mechanism travels to move the stabilizer contact element to contact the blade face, the tip contacts a set screw that limits, that is stops, the travel of the slide protrusion such that the slide stabilizer contact element extends only to the extent necessary to contact the blade face.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2 is a perspective view of the saw blade stabilizer of FIG. 1;

FIG. 3 is a side view of the saw blade stabilizer of FIG. 1;

FIG. 4A is a front view of the saw blade stabilizer of FIG. 1 in a state of retraction;

FIG. 4B is a blown up view of the area taken about 4B of FIG. 4A;

FIG. 4C is a blown up view of the area taken about 4C of FIG. 4A but with the saw blade stabilizer in a state of extension;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
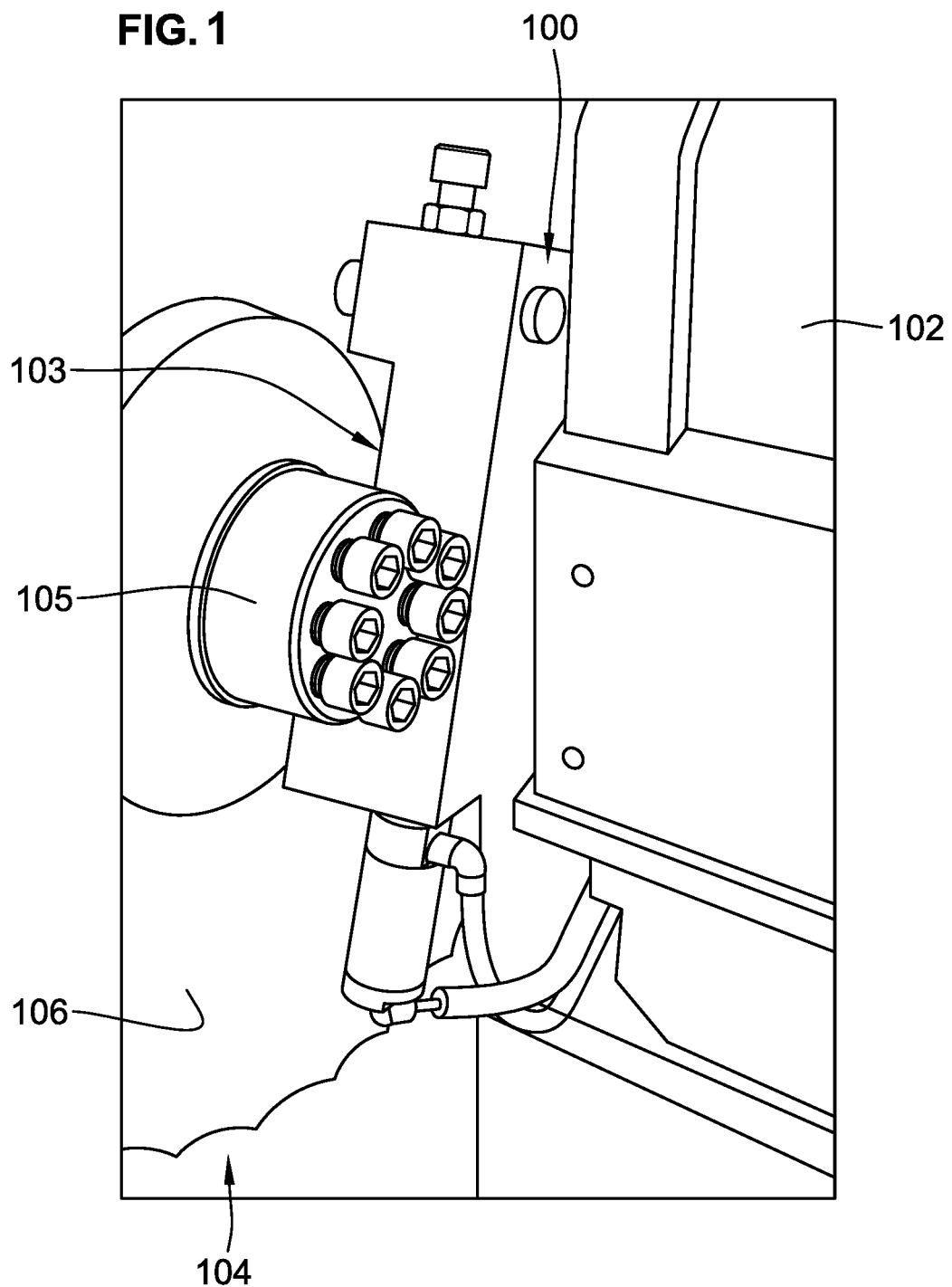
FIG. 1 is a partial perspective view of a cut-off sawing system employing an embodiment of a saw blade stabilizer according to the teachings of the instant invention.

Turning now to the drawings, there is illustrated in FIG. 1 an exemplary embodiment of a saw blade stabilizer 100 fixed on sawing apparatus 102 to stabilize a circular saw blade 104. While such an exemplary environment will be utilized in describing various features and advantages of embodiments of the invention, such a description should be taken by way of example and not by limitation. Indeed, advantages of embodiments of the invention can be used to improve a variety of sawing apparatus where it is desirable to stabilize a circular saw blade.

Sawing apparatus 102 may utilize one or more saw blade stabilizers 100. For example, while the saw blade stabilizer 100 is shown on blade face 106, saw blade stabilizer 100 may be used on the other face (not illustrated) or both faces. Saw blade stabilizer 100 also advantageously includes spindle hub cut out 103 for accommodating a spindle hub 105 that locks the circular saw blade 104 in place.

FIGS. 2 and 3 illustrate a stabilizer contact element 120 of the saw blade stabilizer 100.

FIG. 4A illustrates the stabilizer contact element 120 of the saw blade stabilizer 100 relative to the blade face 106 of the circular saw blade 104. The stabilizer contact element 120 has a stabilizer end face 128. The stabilizer contact element 120 is illustrated in a retracted state relative to a blade side face 132 of a housing 134 of the saw blade stabilizer 100.

FIG. 4B also illustrates the stabilizer contact element 120 is in a retracted state spaced a first distance 130 away from a blade side face 132 of a housing 134 of the saw blade stabilizer 100. The blade face 106 of the circular saw blade 104 is located at a second distance 136 away from the blade side face 132. The second distance 136 is greater than the first distance 130 such that there is no contact between the stabilizer end face 128 and blade face 106 when the stabilizer contact element 120 is in the retracted state.

FIG. 4C illustrates the saw blade stabilizer 100 with the stabilizer contact element 120 in an extended state. In the extended state, the stabilizer end face 128 is in contact with the blade face 106 of the circular saw blade 104 to stabilize the circular saw blade 104 as it rotates.

Figure 5:
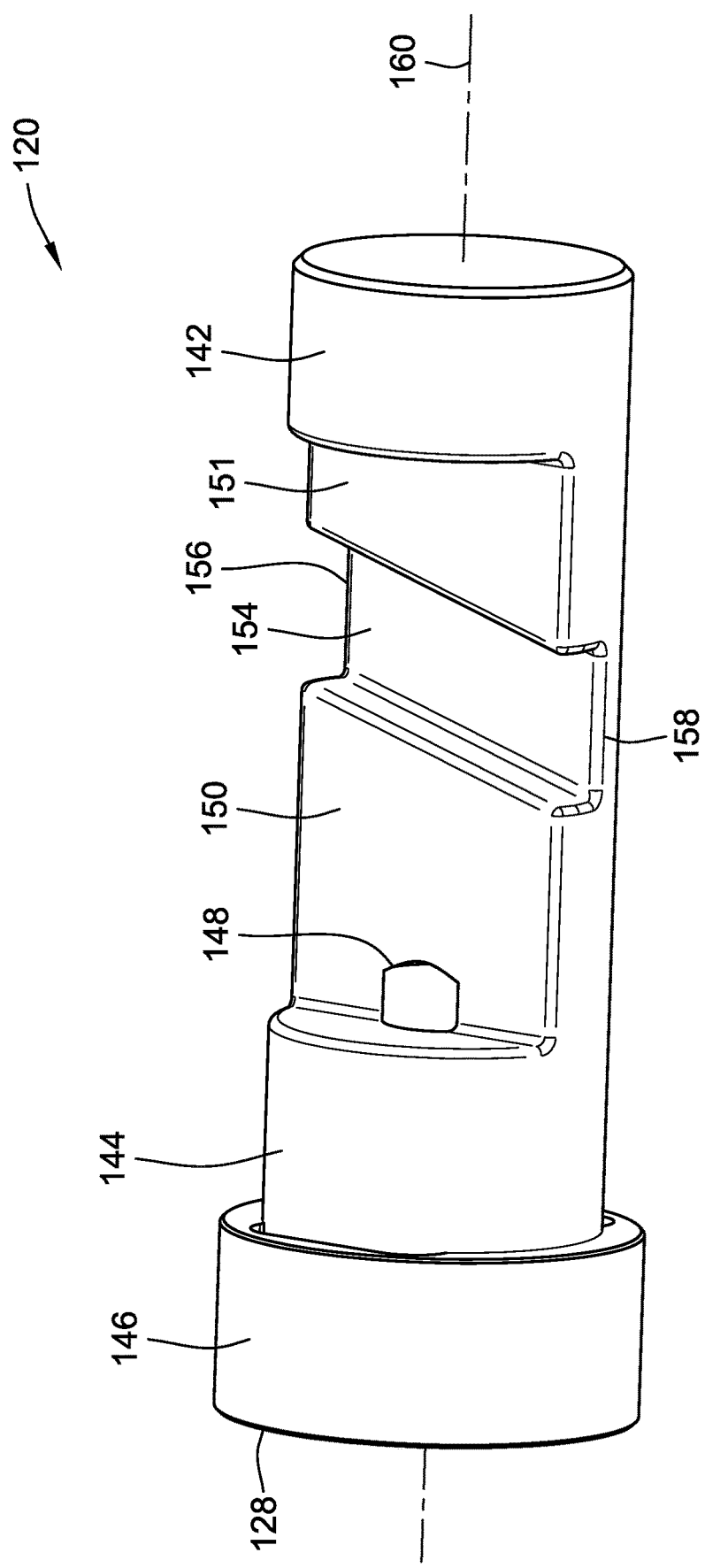
FIG. 5 is an enlarged perspective view of a stabilizer contact element of the saw blade stabilizer of FIG. 1.

FIG. 5 is a perspective view of the stabilizer contact element 120 having a contact element body 142 that is generally cylindrical in shape. The contact element body 142 has a first end 144 to which a button 146 may be attached utilizing a fastener 148. It is not the intent to limit embodiments to the fastener 148 as other means may be utilized, for example weldments or even integral construction. Button 146 is generally in the shape of a cylindrical disk and includes the stabilizer end face 128. The fastener 148 is recessed into the stabilizer end face 128 of the button 146 such that it does not contact the blade face 106 in use. Further, its removability facilitates ease of replacement of the button 146 with its stabilizer end face 128 worn by use. Contact element body 142 includes recessed faces 150, 151 and channel 154. The channel 154 extends obliquely relative to a contact central longitudinal axis 160 defined by the contact element body 142 from a first side 156 to a second side 158 of the contact element body 142.

Figure 6:
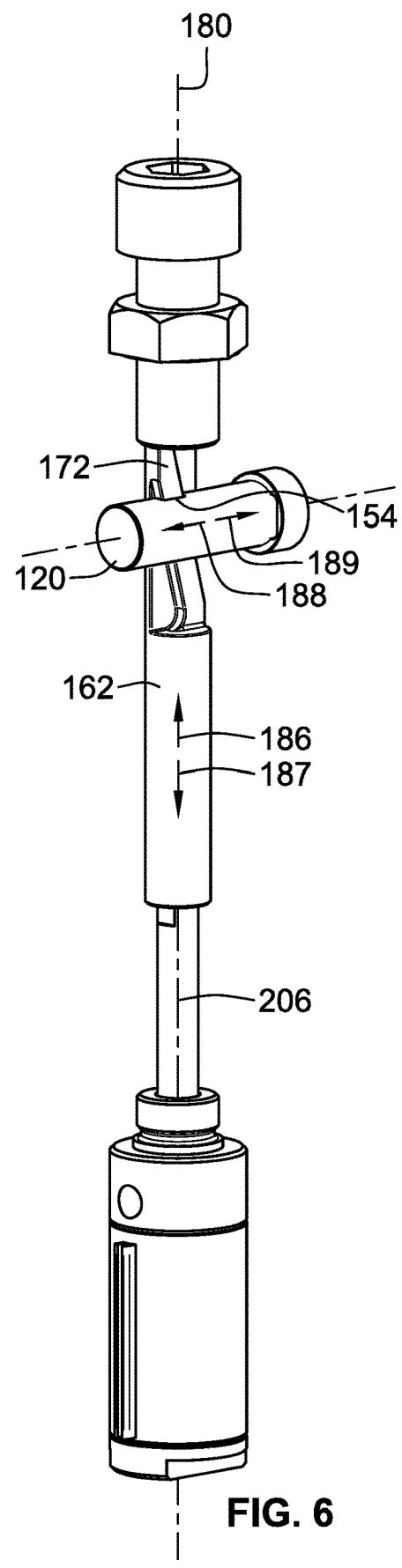
FIG. 6 is a perspective view of the assembled stabilizer contact element and wedge mechanism of the saw blade stabilizer of FIG. 1 with a housing of the blade stabilizer removed.

FIG. 6 illustrates the arrangement of the stabilizer contact element 120 relative to a mechanical wedge 162. Movement of the mechanical wedge 162 in direction 186 parallel to a wedge central longitudinal axis 180 which is in line with a shaft 206 central longitudinal axis moves a slide protrusion 172 of the mechanical wedge 162 within the channel 154 of the stabilizer contact element 120. Both the slide protrusion 172 and the channel 154 extend obliquely relative to wedge central longitudinal axis 180. Because of the oblique extensions, movement of the slide protrusion 172 within the channel 154 moves the stabilizer contact element 120 in direction 189, that is, not in line with the wedge central longitudinal axis 180. Conversely, movement of the mechanical wedge 162 in direction 187 moves the stabilizer contact element 120 in direction 188 opposite the direction 189. The directions 188, 189 may be directions of movement that extend at an angle relative to the wedge central longitudinal axis 180, wherein the angle is not zero and in an embodiment may be ninety degrees, that is directions 188, 189 may be normal to the wedge central longitudinal axis 180.

Figure 7:
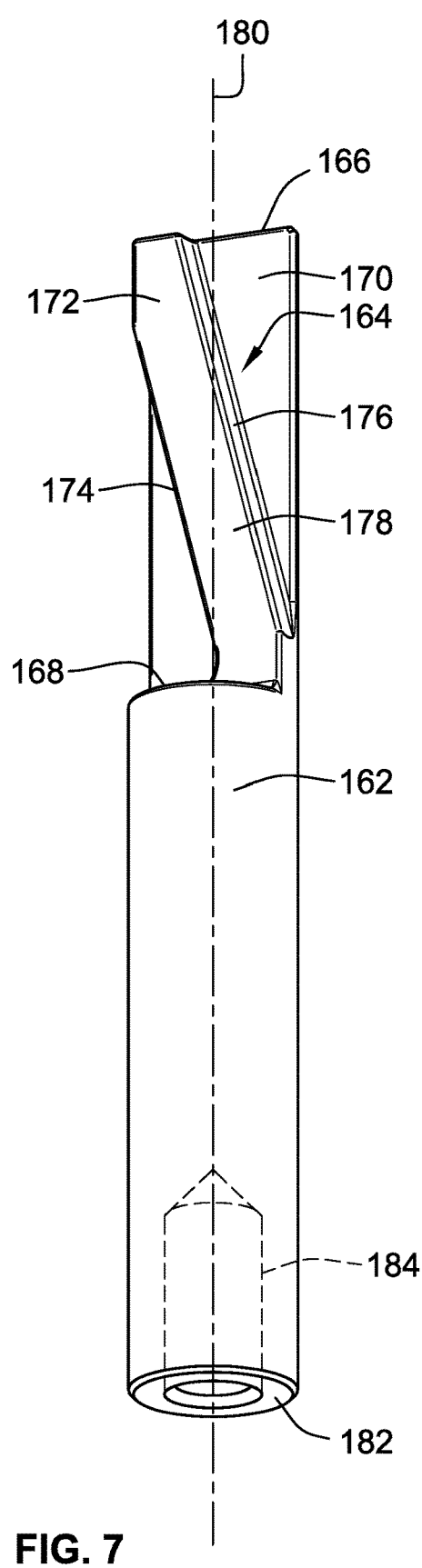
FIG. 7 is a perspective view of the wedge mechanism of the saw blade stabilizer of FIG. 1.

Turning to FIG. 7, the mechanical wedge 162 is shown in further detail. Mechanical wedge 162 defines a cut out 164 that does not extend a full longitudinal length of the mechanical wedge 162 as measured from a top 166 of the mechanical wedge 166 to a wedge bottom 182. Instead, cut out 164 extends from a top 166 of the mechanical wedge 162 to a cut out bottom 168 that defines an at least partially planar surface 170. The cut out bottom 168 is located between the wedge bottom 182 and the top 166. The cut out 164 defines bearing surface 170. A slide protrusion 172 extends outwards from the bearing surface 170. The slide protrusion 172 includes a first planar side 174, a second planar side 176 and planar top 178 between the first and second planar sides 174, 176. Mechanical wedge 162 defines the wedge central longitudinal axis 180. The slide protrusion 172 extends obliquely across the wedge central longitudinal axis 180. The wedge bottom 182 defines a blind hole 184.

Figure 8:
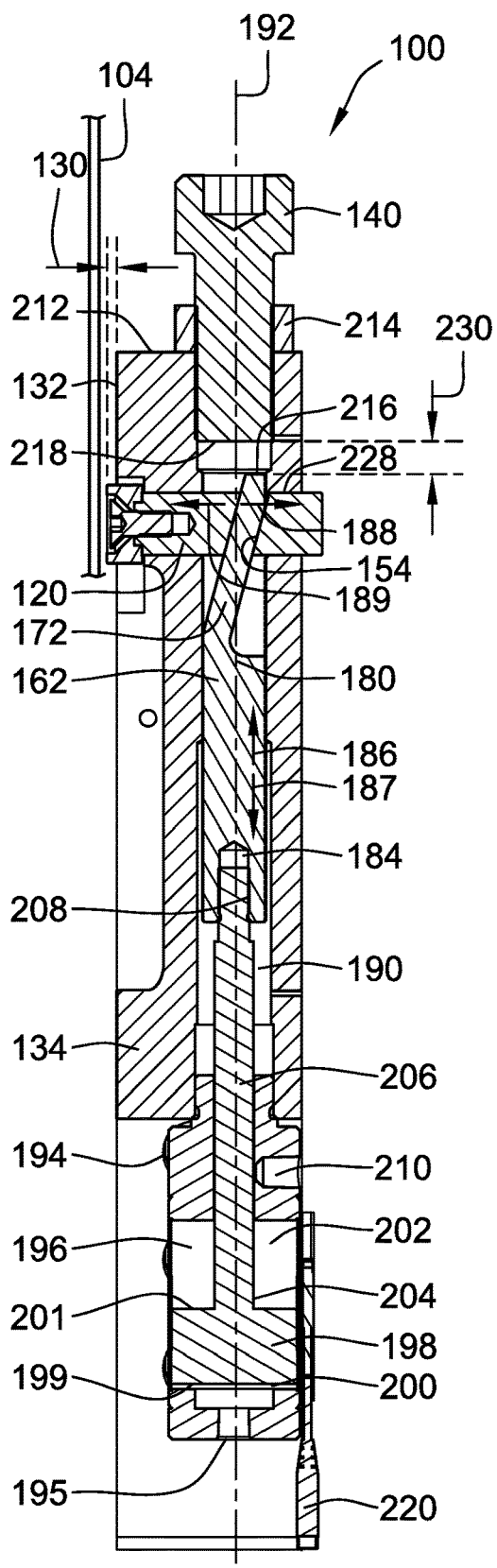
FIG. 8 is a cross section taken about line A-A of the blade stabilizer of FIG. 3 in a retracted state.

FIG. 8 illustrates in cross section the saw blade stabilizer 100 of FIG. 3, taken about line A-A. The saw blade stabilizer 100 and the stabilizer contact element 120 are illustrated in the retracted state wherein the stabilizer contact element 120 is the first distance 130 away from the blade side face 132 of the housing 134.

Figure 9:
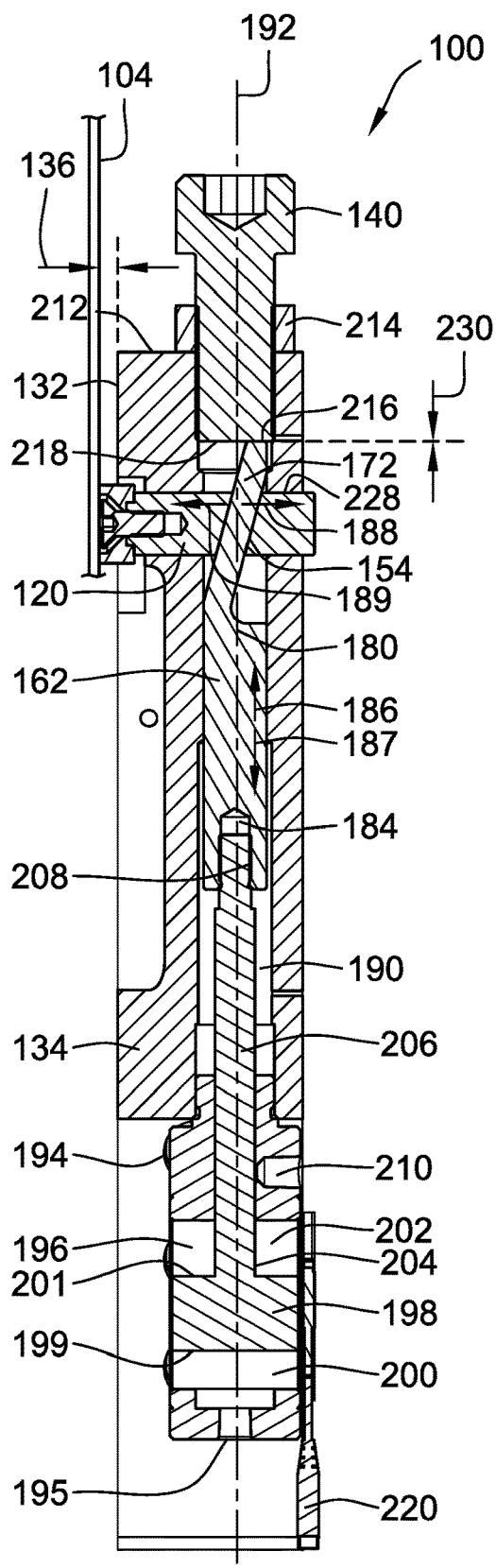
FIG. 9 is a cross section taken about line A-A of the blade stabilizer of FIG. 3 but in an extended state.

FIG. 9 differs from FIG. 8 in that the stabilizer contact element 120 is in the extended state, wherein the stabilizer contact element 120 is the second distance 136 away from the blade side face 132 of the housing 134.

With respect to FIGS. 8 and 9, the saw blade stabilizer 100 is a fluid-actuated device. Housing 134 defines a cavity 190 having a cavity central longitudinal axis 192. The cavity 190 receives a shaft 206 extending through a cylinder 194. The cylinder 194 defines a fluid pressure chamber 196. A piston 198 is located within the fluid pressure chamber 196 and divides the fluid pressure chamber 196 into first and second chambers 200, 202 respectively.

In operation, a fluid under pressure enters extension port 195 and is applied to a first side 199 of the piston 198. The piston 198 moves toward the stabilizer contact element 120 in direction 186. Movement of the piston 198 in direction 186 moves the mechanical wedge 162 in direction 186 which moves the slide protrusion 172 within the channel 154 towards a set screw 140 located at least partially in the cavity 190. As previously discussed, movement of the slide protrusion 172 within the channel 152 in direction 186 moves the stabilizer contact element 120 in direction 188 that is not in line with the wedge central longitudinal axis 180 and cavity central longitudinal axis 192. The set screw 140 may serve to limit the travel of the slide protrusion 172.

Conversely, movement of the piston 198 in direction 187 away from the stabilizer contact element 120 occurs when the fluid enters the second chamber 202 through a retraction port 210 to act on the second side 201 of the piston 198. Movement of the piston 198 in direction 187 moves the mechanical wedge 162 in direction 187, moving the slide protrusion 172 within the channel 154 away from the set screw 140. Movement of the slide protrusion 172 within the channel 152 away from the set screw 140 moves the stabilizer contact element 120 in direction 189 normal to the wedge central longitudinal axis 180 and cavity central longitudinal axis 192.

In an embodiment, the fluid is compressed air. In an embodiment, the fluid pressure to be supplied to the extension port 195 and/or the retraction port 210 can be between 50 and 125 psi. In another preferred embodiment the fluid pressure can be between 75 and 100 psi and in still a more preferred embodiment the fluid pressure can be between 85 and 95 psi.

The piston 198 is located at a proximal end 204 of a shaft 206. Shaft 206 has a portion located in the cylinder 194 and a portion extending through the cylinder 194 into and centrally located within the cavity 190. The shaft 206 is moveable within the housing 134 in the directions 186, 187 parallel to the cavity central longitudinal axis 192 towards or away from stabilizer contact element 120. A distal end 208 of the shaft 206 is received into the blind hole 184 of the mechanical wedge 162. Because the mechanical wedge 162 is mounted on the distal end 208 of the shaft 206, movement of the piston 198 in turn moves the shaft 206 and the mechanical wedge 162 in the same direction toward or away from the stabilizer contact element 120. The mechanical wedge 162 in an embodiment may be integral with the shaft 206 and other connection means are envisioned including for example welds or fasteners or threaded fitment.

As previously discussed, movement of the piston 198 moves the mechanical wedge 162 which results in movement of the slide protrusion 172 within the channel 154 of the stabilizer contact element 120. Stabilizer contact element 120 is prevented from moving towards or away from the set screw 140 at an end of the housing 134 because a bore 228 defined by the housing 134 receives the stabilizer contact element 120 therethrough. The bore 228 prevents movement of the stabilizer contact element 120 in a direction that that is parallel to the cavity central longitudinal axis 192, that is, towards or away from the set screw 140.

As the slide protrusion 172 moves toward the set screw 140, the stabilizer contact element 120 moves in a direction that is not in line with the cavity central longitudinal axis 192 to extend away from the blade side face 132 of the housing 134. Movement of the mechanical wedge 162 towards the stabilizer contact element 120 may be limited by the set screw 140 that extends into the cavity 190 at housing end face 212 through a threaded nut 214 external to the housing 134.

More specifically, the mechanical wedge 162 has tip 216 at an end of the slide protrusion 172. Movement of the mechanical wedge 162 is stopped, that is limited, when the tip 216 bears against a set screw end face 218. It can now be readily appreciated that one way to control the distance the stabilizer end face 128 of the stabilizer contact element 120 extends away from blade side face 132 of the housing 134 is to adjust the set screw 140 to move the screw end face 218 towards or away from a housing end face 212 and stabilizer contact element 120.

Indeed, in the embodiment illustrated in FIG. 8, the tip 216 is able to move towards the end face 218 a gap distance 230. Movement of the set screw end face 218 away from the housing end face 212 and towards the stabilizer contact element 120 decreases the amount of extension, that is, the distance the stabilizer end face 128 moves away from the blade side face 132 of the housing 134. Adjustment of the set screw 140 to move screw end face 218 closer to housing end face 212 and away from the contact stabilizer element 120 increases the amount of extension the stabilizer end face 128 moves away from the blade side face 132 of the housing 134.

Movement of the slide protrusion 172 away from the set screw 140 in a direction parallel to the cavity central longitudinal axis 192 retracts the stabilizer contact element 120 towards the blade side face 132 of the housing 134. As discussed, movement of the slide protrusion 172 towards the set screw 140 in the direction parallel to the cavity central longitudinal axis 192 extends the stabilizer contact element 120 away from the blade side face 132 of the housing 134.

In an embodiment, the stabilizer contact element 120 in cooperation with the mechanical wedge 162, when in extension, produces a holding force to resist the vibration of the circular saw blade 104. The holding force acts away from the blade side face 132 of the housing 134 and on the blade face 106. Thus, the holding force acts in a direction that is not in line with the cavity central longitudinal axis 192 and not in line with the blade face 106. In an embodiment the holding force acts normal to the central longitudinal axis 192 and normal to the blade face 106.

In an embodiment, the holding force is between 500 and 1500 pounds per square inch (psi). In a preferred embodiment the holding force is between 800 and 1200 psi. In still a more preferred embodiment the holding force is between 900 and 1000 psi. Thus, in an embodiment, the compressed air fluid pressure of 90 psi acting on the piston 198 to move the piston 198 towards the set screw 140 can generate a holding force over ten times as large, that is 900 psi acting through the stabilizer contact element 120 in cooperation with the mechanical wedge 162 to hold the saw blade 104 in its rotational plane as it counters the circular saw blade's 104 vibrations to start the saw blade 104 on straight, true cut line.

Indeed, the vibrations of the circular saw blade 104 act against the holding force, that is, pushes on the stabilizer contact element 120 in a direction toward the blade side face 132. The mechanical interference created by the slide protrusion 172 in the channel of the stabilizer contact element 120 prevents movement of the stabilizer contact element 120. This elegant mechanical interaction allows for the elimination of complex and expensive hydraulic piping as well as hydraulic intensifiers of prior designs. Rather, than having to generate a hydraulic force to keep the stabilizer contact element 120 in contact with the circular saw blade 104, as in prior designs, here, mechanical interference blocks any movement of the stabilizer contact element 120. More specifically, the blocking is provided by the oblique extension of the slide protrusion 172 within the oblique extension of the channel 154 of the mechanical wedge 162 which also extends obliquely.

Movement of piston 198 may be detected by a sensor 220 to indicate to a user and or to a controller (not shown) whether the stabilizer contact element 120 is extended or retracted. Thus, the sensor 220 acts as a safety to prevent the blade 104 from cutting off an extended stabilizer contact element 120. In an embodiment, the sensor 220 may be a solid state magnetic switch for detecting movement of the piston 198 which may be metal or a composite thereof. In an embodiment the sensor 220 may detect unwanted movement of the piston caused by excessive blade vibration such that the sensor acts as an emergency stop to shut down, that is stop the circular saw blade 104.

It is not the intent to limit embodiments to magnetic solid state switches as other sensors are envisioned including mechanical switches and electrical switches utilizing electrical contacts in a variety of ways well known to those familiar with the art for sensing movement of the piston 198.

Figure 10:
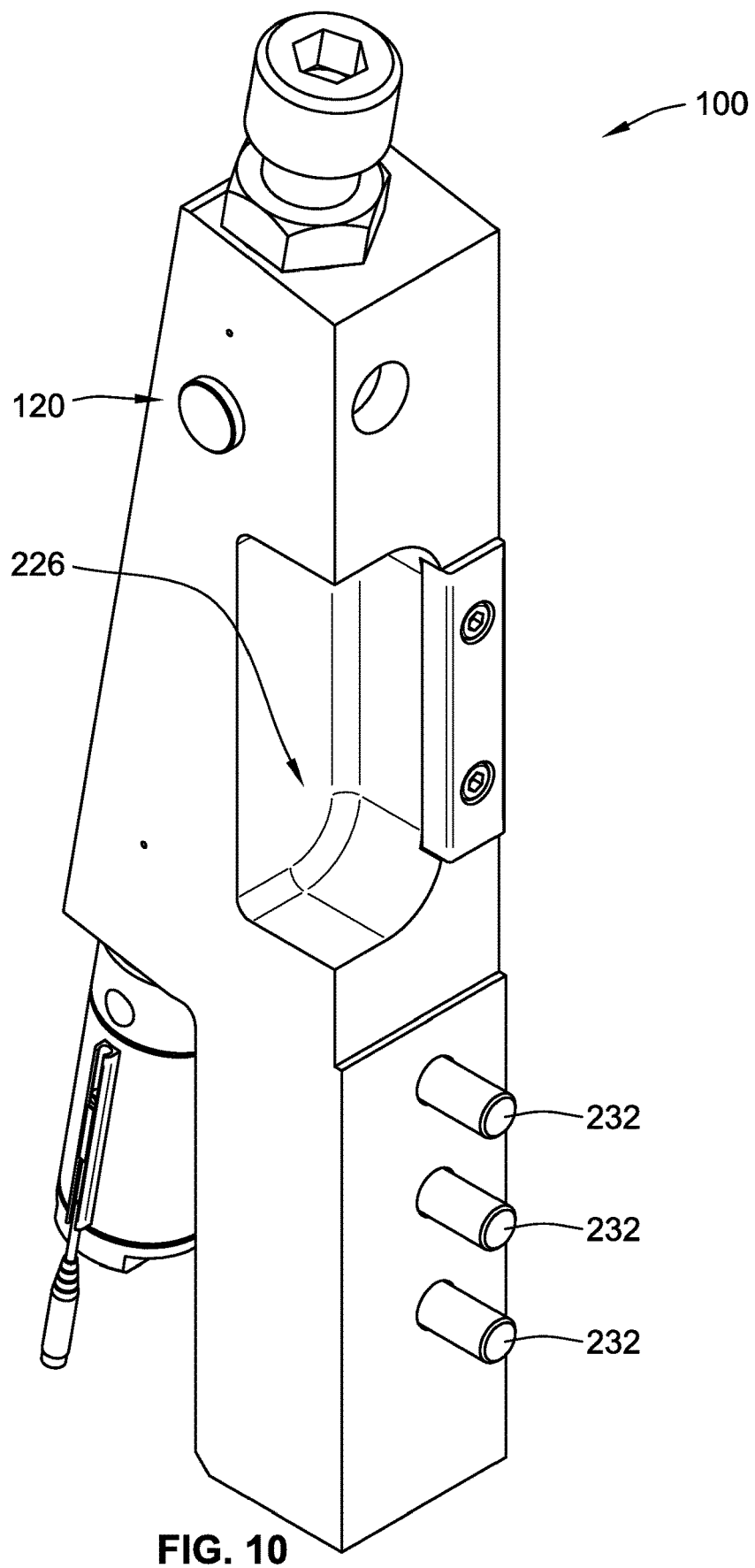
FIG. 10 is another perspective view of the blade stabilizer of FIG. 2.

FIG. 10 is another side view of the saw blade stabilizer 100 and illustrates a positive clamp jaw 226 and fasteners 232 for securing the saw blade stabilizer 100 to a sawing apparatus.

In various embodiments of the invention, it is contemplated that the saw blade stabilizer 100 may take any appropriate form. In the embodiments shown the stabilizer contact element 120 is brought into contact with the circular saw blade 104 through application of a pressurized fluid of compressed air. However, it is envisioned that other gasses, or liquids such as oil, hydraulic fluid, cutting fluid, may be used. It is specifically contemplated that in some embodiments of the invention the saw blade stabilizer 100, in accordance with the invention may also be actuated with any other form of applicable actuator including, but not limited to: electrical solenoids or motors, magnetic devices, geared or screw type mechanical actuators, or any other combination of actuation arrangement suitable for practicing the invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A saw blade stabilizer for stabilizing a saw blade, said saw blade stabilizer comprising:
   a housing;
   a shaft at least partially within a cavity of the housing;
   a piston connected to one end of the shaft;
   a mechanical wedge connected to a second end of the shaft in the housing, the mechanical wedge having a generally rectangular slide protrusion extending obliquely relative to a longitudinal axis of the mechanical wedge;
   a stabilizer contact element having a fixed width channel configured to slideably receive the generally rectangular slide protrusion of the mechanical wedge;
   wherein movement of the piston slides the portion of the mechanical wedge within the channel of the stabilizer contact element and moves the stabilizer contact element in a first direction not in line with the movement of the piston; wherein the stabilizer contact element is configured to contact a surface of the saw blade.

2. The saw blade stabilizer of claim 1, wherein the shaft defines a shaft central longitudinal axis, the slide protrusion and the channel both extending obliquely relative to the shaft central longitudinal axis.

3. The saw blade stabilizer of claim 2, wherein the oblique extension of the slide protrusion in the channel prevents movement of the stabilizer contact element in a second direction opposite the first direction.

4. The saw blade stabilizer of claim 1, wherein movement of the piston away from the stabilizer contact element moves the slide protrusion within the channel and moves the stabilizer contact element in the second direction opposite the first direction.

5. The saw blade stabilizer of claim 1, wherein the stabilizer contact element defines a contact longitudinal axis, the stabilizer contact element located at least partially in a bore of the housing such that the contact longitudinal axis extends in a direction that is not in line with the shaft central longitudinal axis.

6. The saw blade stabilizer of claim 1, the stabilizer contact element having an end face located outside the housing, wherein in a retracted state of the stabilizer contact element the end face is a first distance away from a blade side face of the housing.

7. The saw blade stabilizer of claim 6, wherein in an extended state of the stabilizer contact element the end face is located a second distance away from the blade side face, the second distance greater than the first distance.

8. The saw blade stabilizer of claim 7, wherein movement of the mechanical wedge towards the stabilizer contact element moves the stabilizer contact element to the extended state.

9. The saw blade stabilizer of claim 8, wherein movement of the mechanical wedge away from the stabilizer contact element moves the stabilizer contact element to the retracted state.

10. The saw blade stabilizer of claim 1, wherein movement of the slide protrusion a first length toward the stabilizer contact element is limited by a tip of the slide protrusion in contact with an adjustment screw extending into the housing.

11. The saw blade stabilizer of claim 10, wherein turning the adjustment screw to move the screw further into the housing limits movement of the slide protrusion to a second length toward the stabilizer contact element, the second length less than the first length.

12. The saw blade stabilizer of claim 10, wherein movement of the slide protrusion the first length moves the stabilizer contact element the first length.

13. The saw blade stabilizer of claim 1, wherein the piston is located within a cylinder, the cylinder configured to receive compressed air to move the piston.

14. A saw blade stabilizer for stabilizing a saw blade, said saw blade stabilizer comprising:
   a housing;
   a shaft defining a shaft longitudinal axis, the shaft at least partially within a cavity of the housing;
   a piston connected to one end of the shaft;
   a mechanical wedge having a generally rectangular slide protrusion, the mechanical wedge connected to a second end of the shaft in the housing;

a stabilizer contact element having a channel of a fixed width along an entire length of the channel;

wherein the stabilizer contact element and the channel extend obliquely relative to the shaft longitudinal axis and the the channel slideably receives the slide protrusion; wherein the stabilizer contact element is configured to contact a surface of the saw blade.

15. The saw blade stabilizer of claim 14, wherein movement of the piston slides the slide protrusion within the channel to move the stabilizer contact element in a first direction not in line with the movement of the piston.

16. The saw blade stabilizer of claim 15, wherein the piston is located within a cylinder, the cylinder configured to receive compressed air to move the piston.

* * * * *